(12) United States Patent
Hara

(10) Patent No.: US 6,432,852 B1
(45) Date of Patent: Aug. 13, 2002

(54) COATED GLASS WORK AND METHODS

(76) Inventor: Keiko Hara, 336 N. Division St., Walla Walla, WA (US) 99362

( * ) Notice: Subject to any disclaimer, the term of this patent is extended or adjusted under 35 U.S.C. 154(b) by 0 days.

(21) Appl. No.: 09/466,538

(22) Filed: Dec. 17, 1999

(51) Int. Cl.$^7$ .................................................. C03C 8/14
(52) U.S. Cl. ............................................. 501/17; 501/5
(58) Field of Search ............................ 524/563; 501/17, 501/5

(56) References Cited

U.S. PATENT DOCUMENTS

| | | | |
|---|---|---|---|
| 1,469,825 A | | 10/1923 | Seel |
| 2,225,659 A | | 9/1940 | Remington et al. ......... 106/36.2 |
| 2,281,909 A | | 5/1942 | Barsky et al. ................ 41/38.6 |
| 2,316,745 A | | 4/1943 | Robertson et al. ............. 106/48 |
| 2,321,656 A | | 6/1943 | Chester ........................ 106/48 |
| 2,379,507 A | | 7/1945 | Deyrup et al. ................ 260/16 |
| 2,610,127 A | | 9/1952 | Kerridge et al. .............. 106/26 |
| 3,356,515 A | | 12/1967 | McGlothin .................... 106/84 |
| 3,931,055 A | * | 1/1976 | Friese ......................... 252/503 |
| 4,006,106 A | * | 2/1977 | Yoshida ....................... 252/513 |
| 4,037,004 A | * | 7/1977 | Nakano ....................... 427/145 |
| 4,381,333 A | | 4/1983 | Stewart et al. ........... 428/312.6 |
| 4,692,662 A | * | 9/1987 | Wada .......................... 313/493 |
| 4,741,962 A | * | 5/1988 | Wada .......................... 428/428 |
| 4,741,963 A | * | 5/1988 | Wada .......................... 428/428 |
| 4,746,346 A | * | 5/1988 | Murakami ...................... 65/43 |
| 5,077,336 A | * | 12/1991 | Nakashita ................... 524/732 |
| 5,082,805 A | * | 1/1992 | Ali ............................. 501/91 |
| 5,308,481 A | * | 5/1994 | Stalling ................... 210/198.2 |
| 5,362,554 A | * | 11/1994 | Holzer ........................ 428/283 |
| 5,403,787 A | * | 4/1995 | Day .............................. 501/7 |
| 5,443,669 A | | 8/1995 | Tunker ........................ 156/102 |
| 5,496,619 A | | 3/1996 | Itagaki et al. ................ 428/209 |
| 5,632,942 A | * | 5/1997 | Yeh .............................. 156/89 |
| 5,672,460 A | * | 9/1997 | Katoh ......................... 430/198 |
| 5,707,907 A | | 1/1998 | Brown ......................... 501/20 |
| 5,783,506 A | | 7/1998 | Eppler et al. ................. 501/14 |

FOREIGN PATENT DOCUMENTS

| | | |
|---|---|---|
| GB | 2 118 928 A | 11/1983 |
| JP | 54045325 A | 4/1979 |
| JP | 55062825 | 5/1980 |

* cited by examiner

Primary Examiner—Paul R. Michl
(74) Attorney, Agent, or Firm—Hall, Priddy, Myers & Vande Sande

(57) ABSTRACT

Systems and methods are described for coated glass work, compositions and multilayer coatings. A multilayer coated glass work includes: a substrate; and a composition coupled to the substrate, the composition defining a multilayer coating coupled to the substrate. Each of a plurality of sublayers that compose the multilayer coating includes, when initially coupled to the substrate, glass powder, water and methyl cellulose. Multi-layer coated colored printed glass panels based on the invention do not break during firing. The composition as prepared is acid-free, non-toxic, odorless, and colorless. The composition has a long shelf life, a good consistency similar to a screen printing ink and offers an adhesive surface on which to apply additional colored glass powder evenly. The invention results in clear, detailed, dense and brilliant colored images. The invention makes it possible to produce editioned fine art pieces with a printed design inside of glass. It offers another potential to print various images using today's technological processes such as computer, photography and others.

34 Claims, No Drawings

COATED GLASS WORK AND METHODS

BACKGROUND OF THE INVENTION

1. Field of the Invention

The invention relates generally to the field of coatings. More particularly, the invention relates to coated glass work, compositions for coating substrates and multilayer coatings.

2. Discussion of the Related Art

In the past, finely ground colored glass powders were used for printing images on the surface of glass. To prepare a printing composition, the finely ground colored glass powders are mixed with a liquid phase base and coated on the surface of the glass. The coated glass article can then be fired.

An example of the foregoing is enamel work. Typically, enamel work uses a coating composition that includes the finely ground colored glass powders and an oil (e.g., pine oil) as a liquid phase base.

A problem with this existing technology is that it does not allow firing more than one coating layer at a time. Cofiring a multi-layer coated substrate results in breakage because of the oil base in the enamel composition. Therefore, what is required is a solution that permits cofiring a multi-layered glass coating.

One unsatisfactory approach, in an attempt to solve the multi-layer coating problem is to omit the oil base. However, when the oil base is omitted, the glass powders do not mix and flow well. Glass technicians have been extremely frustrated when the images put onto the glass before firing would disappear when the glass was fired. Therefore, what is also required is a solution that permits omitting, or replacing, the oil base.

Heretofore, the requirements of cofiring a multi-layered glass coating and omitting the oil base referred to above have not been fully met. What is needed is a solution that simultaneously addresses both of these requirements. The invention is directed to meeting these requirements, among others.

SUMMARY OF THE INVENTION

A goal of the invention is to simultaneously satisfy the above-discussed requirements of cofiring a multi-layered glass coating and omitting the oil base which, in the case of the prior art, are mutually contradicting and are not simultaneously satisfied.

One embodiment of the invention is based on an apparatus, comprising: a glass substrate; and a composition coupled to the glass substrate, wherein the composition, as initially coupled to the glass substrate, includes glass powder, water and methyl cellulose. Another embodiment of the invention is based on a composition, comprising: glass powder; and more than 2 weight percent methyl cellulose based on the total weight of the composition. Another embodiment of the invention is based on an apparatus comprising: a substrate; and a composition coupled to the substrate, the composition defining a multilayer coating coupled to the substrate, wherein each of a plurality of sublayers that compose the multilayer coating include, when initially coupled to the substrate, glass powder, water and methyl cellulose.

These, and other, goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention with out departing from the spirit thereof, and the invention includes all such modifications.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The below-referenced U.S. Patents disclose embodiments that were satisfactory for the purposes for which they were intended. The entire contents of U.S. Pat. Nos. 1,469,825; 2,225,659; 2,281,909; 2,316,745; 2,321,656; 2,379,507; 2,610,127; 3,356,515; 5,443,669; 5,496,619; 5,632,942; 5,707,907; and 5,783,506 are hereby expressly incorporated by reference into the present application as if fully set forth herein.

A context of the invention includes coating and firing glass work. This context of the invention includes multi-layered printed and fired glass work. In addition to art objects, this context of the invention can also include functional objects and architectural glass.

Another context of the invention includes coating and firing metals and/or ceramics. This context of the invention also includes multi-layer coatings. As above, in addition to art objects, this context of the invention can include functional objects and architectural details.

The invention can include an unfired composition that contains glass powder, water and methyl cellulose. Preferably, the composition includes more than 2 weight percent methyl cellulose based on the total weight of the unfired composition. The methyl cellulose does not leave any residue and stays clear.

The water and methyl cellulose are mixed together to form a paste. The methyl cellulose powder should be added into warm water and mixed well. In either event, it is preferable to use distilled water. The methyl cellulose is preferably provided as a powder. The thickness of the paste can be adjusted by controlling the amount of water. A standard thickness water-cellulose mixture can be made with a 4 cc methyl cellulose in a one pound (1 pint) water jar.

In any event, the colored glass powder(s) can be added to the water-methyl cellulose mixture. The resulting composition includes at least one type of glass powder, water and methyl cellulose. The composition can include more than one type of glass powder. A standard composition (e.g., standard printing ink) can be made with approximately 20% water-cellulose paste and approximately 80% colored glass powder.

The relative amounts of water and methyl cellulose in the water-cellulose paste mixture should be from approximately 20 to approximately 24 parts of water; and from approximately 1 to approximately 5 parts of methyl cellulose. Thus, the methyl cellulose can be provided in an amount of from approximately 4.166 to approximately 25.0 weight percent based on the weight of the water-cellulose paste mixture. Of course, the amount of methyl cellulose can be more or less. Consequently, based on a composition containing 20% paste and 80% glass powder, the methyl cellulose can be provided in an amount of from approximately 0.833 to approximately 5.0 weight percent based on the total weight of the unfired composition. Preferred embodiments of the composition include at least approximately 2 (or 3, 4, 5) weight percent methyl cellulose based on the total weight of the unfired composition.

The composition can also include alcohol as an optional addition. If a colored glass powder does not combine well with the water-cellulose mixture, alcohol can be added to the composition to improve dispersion.

The composition can also include mica powder as an optional addition. Mica can be added when the consistency of glass powdered ink is too runny (i.e., viscosity is too low). Mica will add a shiny surface to the finished product.

The composition can also include one or more floculants to assist in the dispersion of the glass powder(s). Such floculants are readily commercially available. The composition can also include one or more of: dextrin; gum arabic; gum tragacanth; gum karaya; hide glue; glar; casein; silicate; and polyvinyl acetate emulsions.

The particular materials used for the paste and/or composition should be readily available. For the studio operation, it is an advantage to employ materials that do not vary substantially from batch to batch as they are shipped from the manufacturer.

However, the particular materials selected for the paste mixture and/or the composition are not essential to the invention, as long as they provide the described functions. Normally, those who make or use the invention will select the best commercially available material based upon the economics of cost and availability, the expected application requirements of the final product, and the demands of the overall manufacturing process.

The particular process(es) used for preparing the paste and/or composition should be inexpensive and reproducible. Conveniently, the preparation of the paste and/or composition of the invention can be carried out by using any mixing method. It is preferred that the process be simple. For a studio operation, it is an advantage to employ a small batch technique.

However, the particular manufacturing process(es) used for preparing the paste and/or composition are not essential to the invention as long as it provides the described functionality. Normally those who make or use the invention will select the preparation process based upon tooling and energy requirements, the expected application requirements of the final product, and the demands of the overall manufacturing process.

The invention can include a fired glass coating on a glass substrate where the coating composition as applied to the glass substrate contains glass powder, water and methyl cellulose. Alternatively, another type of substrate can be used, such as, for example, ceramic, metal, etcetera.

The composition as initially coupled to the glass substrate, includes glass powder, water and methyl cellulose. When dry, the composition can define a coating that includes glass powder and methyl cellulose.

The coating can be directly connected to the glass substrate. Alternatively, there can be an interlayer between the coating and the glass substrate.

An overcoat can be coupled to the coating. The overcoat, as initially coupled to the coating, can include glass powder, water and methyl cellulose. The composition can be applied to the glass substrate through a stencil paper.

The composition, as initially coupled to the substrate, can include at least one member selected from the group consisting of dextin; gum arabic; gum tragacanth; gum karaya; hide glue; glar; casein; silicate; and polyvinyl acetate emulsions. The composition, as initially coupled to the glass substrate, can include alcohol. The composition includes mica powder.

The invention can also include a cofired multi-layer glass coating on a substrate where each of a plurality of unfired sub-coatings that compose the unfired multi-layer coating contains methyl cellulose. In this way, multiple layers of glass can be placed on top of each other and cofired. Any type of substrate can be used in conjunction with the cofired multi-layer glass.

Each of a plurality of sublayers that compose the multi-layer coating can include, when initially coupled to the substrate, glass powder, water and methyl cellulose. When dry, each of the plurality of sublayers includes glass powder and methyl cellulose.

The multilayer coating can be directly connected to the substrate. Alternatively, there can be an interlayer between the multilayer coating and the substrate.

One or more of the unfired sublayers can be applied to the substrate through a stencil paper. One or more of the plurality of unfired sublayers, as initially coupled to the substrate, includes at least one member selected from the group consisting of dextrin; gum arabic; gum tragacanth; gum karaya; hide glue; glar; casein; silicate; and polyvinyl acetate emulsions. One or more of the plurality of unfired sublayers, as initially coupled to the glass substrate, can include alcohol. One or more of the plurality of unfired sublayers can include mica powder.

The invention can also include printing with stenciling papers or using silk screen techniques. Preferred stenciling papers are readily commercially available from Toei Katagami Company, (Mr. Shimumura, Junzo), 7-8-25 Teraya, Suzuka City, Mie-Ken, Japan. These papers create detailed, accurate, registration edges and patterns. These stencil papers stick to the substrate very well during the printing process, especially when spraying the composition on the surface. After printing, soaking these stencil papers with water and then spraying or sponging the surface of the stencil paper results in easy and thorough cleaning. Using these stencil papers help to prevent the ink(s) from seeping between the stencil and the substrate.

There are different thicknesses of these Toei Katagami papers. Varying the thickness of the stencil paper is effective for applying different colored glass paste in different strengths. In this way, different colored inks can be applied in various ways to create density, brilliance and light. The thicker papers that are readily commercially available from Toei Katagami are most preferred. These Toei Katagami stenciling papers have the same quality as Japanese traditional stencil paper (i.e., KATAZOME paper) which was originally used for printing on fabric (i.e., printing or dying Kimono patterns on fabric with a rice paper that is coated with persimmon varnish to be water resistant). However, compared to traditional stencil paper, the Toei Katagami papers are improved with respect to strength, accuracy of registration and versatility. Modified with plastic between the rice paper, these stenciling papers make a strong and durable surface for printing and cleaning. Other stencil papers such as plastic, paper and others do not work as well on a smooth glass surface. Other commercially available stencil papers can be used in connection with the invention, but they are not comparable to the Toei Katagami papers in strength, registration and versatility. After printing with a stencil and/or silk screen, but before the ink is dry, the artisan can sprinkle additional colored glass powder on the coating to increase the intensity of colors.

The invention can also be included in a kit. The kit can include some, or all, of the components that compose the invention. More specifically, the kit can include the glass powder(s), the methyl cellulose and other components of the coating composition. The kit can also include a substrate (e.g., glass substrate). The kit can also contain instructions for practicing the invention and apparatus for carrying out the invention, such as, for example, stenciling papers, silk screen equipment and/or mixing containers. Unless otherwise specified, the components of the kit can be the same as those used in the invention.

The invention can also utilize data processing methods that transform signals from the glass coating (and/or the corresponding composition). For example, the invention can be combined with remote sensing instrumentation to obtain state variable information from the glass coating during the firing process (and/or the corresponding composition during the batching process) to actuate interconnected discrete hardware elements. For instance, to one or more heaters to control the firing process and/or to one or more mixers to control the batching process.

The term approximately, as used herein, is defined as at least close to a given value (e.g., preferably within 10% of, more preferably within 1% of, and most preferably within 0.1% of). The term coupled, as used herein, is defined as connected, although not necessarily directly, and not necessarily mechanically.

While not being limited to any particular performance indicator or diagnostic identifier, preferred embodiments of the invention can be identified one at a time by testing for the presence of good optical properties. The test for the presence of good optical properties can be carried out without undue experimentation by measuring brilliance using a simple and conventional photographic light meter in reflective mode. The test for the presence of good optical properties can also be carried out without undue experimentation by using the photographic light meter in transmissive mode when the substrate is relatively transparent, or at least relatively translucent. Another way to seek preferred embodiments of the invention one at a time is by testing for the presence of high detail. The test for the presence of high detail can be carried out without undue experimentation by visual inspection, optionally with the use of a simple and conventional microscope in reflected light mode, and in transmitted light mode if the substrate is relatively transparent/translucent.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Four cubic centimeters of methyl cellulose powder are placed into a one pound (pint) water jar. One pint of warm water is then introduced into the jar to produce a water-cellulose paste. Four pounds of a colored glass powder is then added to the water-cellulose paste to form a colored glass ink. This colored glass ink (composition) is then printed on the surface of a glass substrate. Because the methyl cellulose containing composition acts like a paste, additional glass powder is sprinkled on the exposed surface of the composition to increase the intensity and brilliance of colors and patterns.

Example 2

One part methyl cellulose powder is dissolved in 24 parts cold distilled water to produce a water-cellulose paste. Two pounds of a first colored glass powder are then added to the water-cellulose paste. Then, two pounds of a second colored glass powder are added. The resulting colored glass ink (composition) is then applied to the surface of a glass substrate through a stencil paper.

Example 3

Five parts methyl cellulose powder is dissolved in 20 parts cold distilled water to produce a water-cellulose paste. Four pounds of a colored glass powder is then added to the water-cellulose paste. The resulting composition from this example is of a higher viscosity than the composition resulting from the previous example. This colored glass ink is then coated on the surface of a porcelain substrate.

Practical Applications of the Invention

A practical application of the invention that has value within the technological arts is coating substrates, especially multi-layer coatings of glass substrates. Further, the invention is useful in conjunction with printing with stenciling papers. There are virtually innumerable uses for the invention, all of which need not be detailed here.

ADVANTAGES OF THE INVENTION

The invention be cost effective and advantageous for at least the following reasons. The composition is acid-free, non-toxic, odorless, and colorless. The composition dries clear and is easily reversible (e.g., soluble) unless it has been fixed. The liquid composition has a long shelf life. When mixed, the finely ground colored glass powder and paste-like methyl cellulose makes a good consistency similar to a screen printing ink. The mixture offers an adhesive surface on which to apply additional colored glass powder evenly with a strainer. The invention makes a dense, bright image.

The invention makes possible the mass production of additional works having printed designs inside a hollow glass substrate. In addition, multi-layered coated colored printed glass panels based on the invention do not break during firing. They produce a clear, detailed, dense and brilliant colored image.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual batch components need not be provided in the disclosed form, or combined in the disclosed ratios, but could be provided in virtually any form, and combined in virtually any ratio. Further, although the coated substrates described herein can be physically separate modules, it will be manifest that the coated substrates may be integrated into larger pieces (i.e., devices) with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means for." Expedient embodiments of the invention are differentiated by the appended subclaims.

What is claimed is:

1. A process, comprising placing multiple layers of glass on top of one another and cofiring including:
   coating a composition onto a first glass substrate;
   coating the composition onto a second glass substrate;
   coupling the first glass substrate to the second glass substrate; and then
   cofiring the first glass substrate and the second glass substrate,
   wherein the composition includes water, colored glass powder and methyl cellulose.

2. The process of claim 1, further comprising coating the composition onto a third glass substrate and coupling the third glass substrate to the second glass substrate, wherein cofiring the first glass substrate and the second glass substrate includes cofiring the third glass substrate.

3. The process of claim 1, wherein the composition includes methyl cellulose in an amount of from approximately 0.833 to approximately 5.0 weight percent based on a total weight of the composition before cofiring.

4. The process of claim 3, wherein the composition includes methyl cellulose in an amount of from approximately 2.0 to approximately 5.0 weight percent based on a total weight of the composition before cofiring.

5. The method of claim 1, wherein the composition includes at least one member selected from the group consisting of dextrin; gum arabic; gum tragacanth; gum karaya; hide glue; glar; casein; silicate; and polyvinyl acetate emulsions.

6. The method of claim 1, wherein the composition includes mica.

7. The method of claim 1, wherein the composition includes a floculant.

8. The method of claim 1, wherein the composition includes alcohol.

9. The process of claim 1, wherein coating includes printing.

10. The process of claim 9, wherein printing includes printing with a computer.

11. The process of claim 1, wherein coating includes silk screening.

12. The process of claim 1, wherein coating includes photography.

13. The process of claim 1, wherein coating includes applying with stencil paper.

14. An article of manufacture, comprising multiple layers of glass on top of one another to be cofired including:
   a first layer including a first glass substrate and a first sublayer coupled to the first glass substrate, the first sublayer including a composition, the composition including water, colored glass powder and methyl cellulose; and
   a second layer coupled to the first layer, the second layer including a second glass substrate and a second sublayer coupled to the second glass substrate, the second sublayer including the composition.

15. The article of manufacture of claim 14, further comprising a third layer including a third glass substrate and a third sublayer coupled to the third glass substrate, the third sublayer including the composition.

16. The article of manufacture of claim 14, wherein the composition includes methyl cellulose in an amount of from approximately 0.833 to approximately 5.0 weight percent based on a total weight of the composition before cofiring.

17. The article of manufacture of claim 16, wherein the composition includes methyl cellulose in an amount of from approximately 2.0 to approximately 5.0 weight percent based on a total weight of the composition before cofiring.

18. The article of manufacture of claim 14, wherein the composition includes at least one member selected from the group consisting of dextrin; gum arabic; gum tragacanth; gum karaya; hide glue; glar; casein; silicate; and polyvinyl acetate emulsions.

19. The article of manufacture of claim 14, wherein the composition includes mica.

20. The article of manufacture of claim 14, wherein the composition includes a floculant.

21. The article of manufacture of claim 14, wherein the composition includes alcohol.

22. The article of manufacture of claim 14, wherein both the first sublayer and the second sublayer are printed.

23. The article of manufacture of claim 14, wherein both the first sublayer and the second sublayer are printed with a computer.

24. The article of manufacture of claim 14, wherein both the first sublayer and the second sublayer are silk screened.

25. The article of manufacture of claim 14, wherein both the first sublayer and the second sublayer are processed with photography.

26. The article of manufacture of claim 14, wherein both the first sublayer and the second sublayer are applied with stencil paper.

27. An article of manufacture, comprising multiple layers of glass placed on top of one another and cofired including:
   a first layer including a first glass substrate and a first sublayer coupled to the first glass substrate, the first sublayer including colored glass formed from a composition including water, colored glass powder and methyl cellulose; and
   a second layer coupled to the first layer, the second layer including a second glass substrate and a second sublayer coupled to the second glass substrate, the second sublayer including glass formed from the composition,
   wherein the first layer and the second layer are cofired.

28. The article of manufacture of claim 27, further comprising a third layer coupled to the second layer, the third layer including a third glass substrate and a third sublayer coupled to the third glass substrate, the third sublayer including glass formed from the composition,
   wherein the first layer, the second layer and the third layer are cofired.

29. The article of manufacture of claim 27, wherein the composition includes mica.

30. The article of manufacture of claim 27, wherein the composition printed.

31. The article of manufacture of claim 27, wherein the composition is printed with a computer.

32. The article of manufacture of claim 27, wherein the composition is silk screened.

33. The article of manufacture of claim 27, wherein the composition is applied with photography.

34. The article of manufacture of claim 27, wherein the composition is applied with stencil paper.

* * * * *